Feb. 10, 1948. C. M. RICE 2,435,845
WATER CLOSET FOR HOUSE TRAILERS, MOBILE RESIDENCES, BUSES AND THE LIKE
Filed May 4, 1945 2 Sheets-Sheet 1

INVENTOR.
Clifford M. Rice
BY George E. Cook.

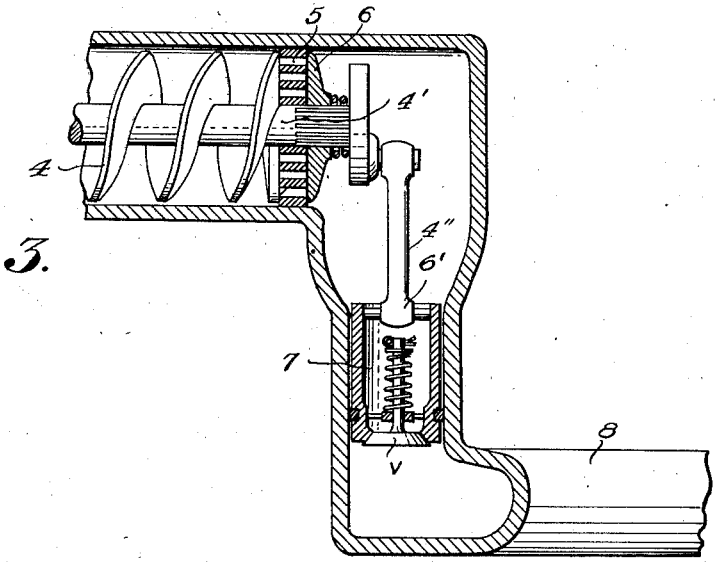
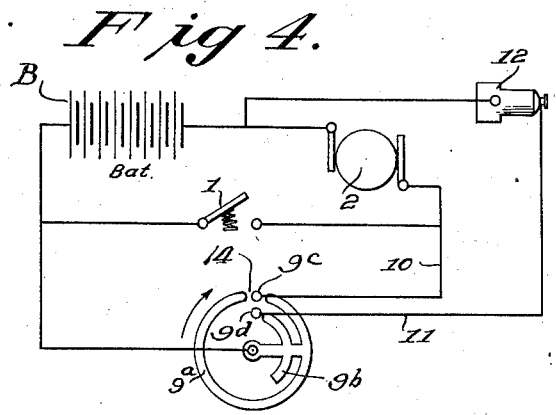
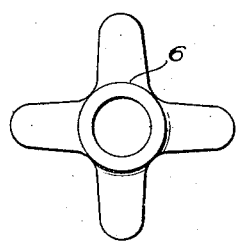

Patented Feb. 10, 1948

2,435,845

UNITED STATES PATENT OFFICE 2,435,845

WATER CLOSET FOR HOUSE TRAILERS, MOBILE RESIDENCES, BUSES, AND THE LIKE

Clifford M. Rice, Alexandria, Va.

Application May 4, 1945, Serial No. 591,932

3 Claims. (Cl. 4—10)

The instant invention relates to water closets or toilets for house trailers, mobile residences, busses, and the like.

One of the primary objects of the invention is the construction of a toilet or water closet which may be employed in a vehicle of the character set out above, said vehicle carrying its own water supply in storage tanks, and said water closet or toilet being constructed to operate in a manner whereby only a fraction of the water normally required by an ordinary water closet is utilized.

In a conventional type water closet or toilet large quantities of water are used combined with a long vertical drop for the waste water. This is impractical for use in a house trailer, mobile residence or bus, and therefore it is a further object of this invention to construct a water closet capable of disposal of waste water and material in a manner consistent with accepted standards of sanitation and which will additionally perform this function with such a small amount of water as to make its use practical in a vehicle where the quantity of water is limited and supplied from tanks.

Still another aim is the making of a water closet of the type specified having means for reducing the waste material to a form capable of readily passing through pipes or hoses of a diameter too small to accommodate said material in its original condition.

Yet a further aim is the construction of a water closet of the character mentioned having means for forcing the waste water and waste material into a storage tank positioned at a higher level than the closet.

Yet another purpose of the invention is the fabrication of a water closet of the form aforementioned having means for maintaining an unbroken flow of water through the waste pipe during the flushing operation so that there will be no danger of odor being emitted from the toilet or waste storage tank, and which upon completion of the flushing operation has the toilet bowl and the waste water pipe leading from the bowl filled with fresh water thus forming an effective seal between the waste storage tank and said bowl.

Yet a further object is the construction of a water closet of the type indicated having means for automatically checking the flushing water from flowing back from the waste tank which is situated at a higher level than the water closet bowl.

The above and other aims and objects of the invention will be apparent from the detailed description hereinafter appearing when taken in conjunction with the appended drawings showing a preferred embodiment and forming a part hereof to which attention is now directed and in which Fig. 1 is a perspective view, partly in section and partly broken away, showing a water closet including a bowl and seat and in which the invention is embodied.

Fig. 3 is a fragmentary elevational view, partly broken away, showing the screw conveyor, means for chopping the waste material and a pump for forcing the chopped material and waste water to the waste water storage tank.

Fig. 4 is a diagrammatic view showing the electrical hook-up for controlling the operation of the screw conveyor and motor and a solenoid-actuated valve in the fresh water line leading to the toilet bowl for the bowl flushing operation; and Fig. 5 is a front elevational view of the chopping spider shown in Fig. 3.

Figures 1, 2:
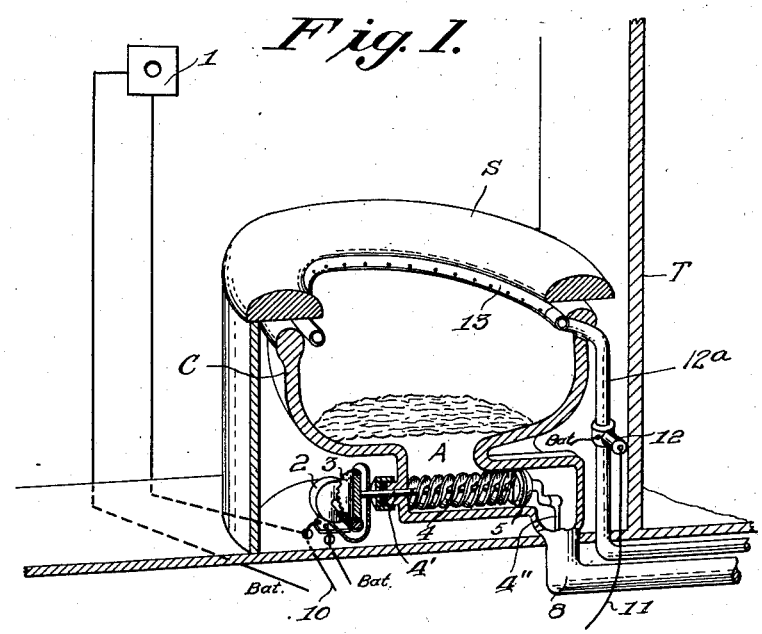
Fig. 2 is a side elevational view of the motor means for operating a waste disposal screw conveyor and electrical control means for the motor and a solenoid-operated flushing valve.

Referring now to the drawings, the reference character C designates a toilet bowl positioned on the floor of a trailer, mobile residence, bus or the like T. The toilet bowl is provided with a conventional seat S and the waste disposal opening A having a rotary screw conveyor 4 journaled therein. The rotary conveyor 4 is connected at one end by means of shaft 4' to a gear 3. Means is provided for actuating the gear and embodies an electric motor 2 operable by switch 1 conveniently located on the wall of the trailer adjacent the bowl C. Motor 2 has a shaft 2' which carries a worm adapted to mesh with gear 3. Thus it will be seen that upon starting of motor 2 through switch 1, in a manner to be described in greater detail hereinafter, the motor shaft 2' will be rotated as well as the worm w secured thereto, said worm rotating gear 3 and shaft 4' causing rotation of waste disposal conveyor 4.

Positioned within waste disposal opening A adjacent one end of the screw conveyor 4 is a stationary perforated waste reducing plate 5 and a spider member 6 secured to and rotatable with said conveyor. As the waste material is deposited in the opening A it is carried by the screw conveyor 4 and forced through the openings in the plate 5 and further reduced by rotation of the spider 6. A crank member 4' is fastened to the conveyor 4, adjacent the spider 6, said crank member having a connecting rod 4″ pivotally secured thereto. The lower end 6′ of the connecting rod 4″ is pivoted to reciprocating pump piston 7 having a spring valve v, said piston operable in a waste disposal pipe 8 which leads to a waste disposal tank (not shown) carried by the mobile residence, trailer, bus, or the like T.

Referring now to Fig. 2 of the drawing, it will be seen that the motor shaft 2′ has a second worm w′ secured thereto for rotation therewith, said worm meshing with a control gear 9′ carrying insulated annular contact strip 9a and shorter contact strip 9b on one face thereof. Stationary brushes 9c and 9d are adapted to contact the strips 9a and 9b, respectively, upon rotation of control gear 9′.

By reference to Fig. 4, it will be noted that current-carrying wires 10 and 11 are connected to the brushes 9c and 9d, respectively, wire 11 leading to a solenoid operated valve 12 in water pipe 12a controlling flow of water to annular flushing ring 13 situated adjacent bowl C and seat S. When switch 1 is closed this completes the circuit from battery B to the motor 2′ which in addition to rotating conveyor 4 rotates control gear 9′ in a clockwise direction as indicated by the arrow in Fig. 2. Rotation of gear 9′ brings brush 9c into contact with annular strip 9a which assures operation of the motor 2 upon opening of switch 1 until the gap 14 in the strip is reached. Before this occurs brush 9d will have contacted shorter strip 9b to open the solenoid operated valve 12 to flush the bowl C through perforated flushing ring or pipe 13. Simultaneously the reciprocating pump piston 7 forces the churned waste into pipe 8 and the rate of flow of fresh water from pipe 13 is adjusted so that some of it is forced into pipe 8 while the largest percentage remains in basin or bowl C forming an effective seal between the waste water tank and the bowl. When brush 9d leaves strip 9b and gap 14 is reached one flushing cycle is completed—as no water flows through the flushing ring 13 and the motor has stopped.

From the above it will be apparent that the various objects of the invention have been attained in an efficient manner. While various changes in the specific embodiment will be apparent to those skilled in the art it is contemplated to cover all such and to be limited in this respect only as may be necessary by the scope of the claims hereto appended.

What I claim and desire to secure by Letters Patent is:

1. A water closet for house trailers, mobile residences and the like comprising a bowl, a screw conveyor in the bottom of the bowl extending transversely thereof, a waste reducing spider adjacent the outlet end of the conveyor and rotatable with the latter, a waste pipe leading from the bowl, a pump in said waste pipe connected to said conveyor, and means for operating the conveyor, reducing spider and pump.

2. A water closet for house trailers, mobile residences and the like comprising a bowl, a screw conveyor in the bottom of the bowl extending transversely thereof, a waste reducing perforated plate and spider adjacent the outlet end of the conveyor and rotatable with the latter, a waste pipe leading from the bowl, a pump in said waste pipe connected to said conveyor, an electric motor for rotating said conveyor, a fresh water pipe having a flushing ring located within the bowl and timing means for operating said motor, pump and flushing ring in proper sequence.

3. A water closet for house trailers, mobile residences and the like comprising a bowl, a motor, a rotatable shaft operated by said motor extending transversely of the bowl adjacent the bottom thereof, a screw conveyor secured to said shaft, a waste reducing plate and spider connected to said shaft adjacent the outlet end of the conveyor, the terminal portion of the shaft having a crank member fastened thereto, said crank member being pivotally connected to a pump piston to impart reciprocatory movement thereto, said pump piston being in a waste pipe connected to said bowl, means for supplying water to said bowl, an electric circuit including a switch and timing means, said switch and timing means initiating and controlling the operation of said motor, the conveyor, the reducing plate and spider, the pump and water supplying means in proper sequence.

CLIFFORD M. RICE.

REFERENCES CITED

The following references are of record in the file of this patent:

UNITED STATES PATENTS

| Number | Name | Date |
| --- | --- | --- |
| 689,915 | Sands | Dec. 31, 1901 |
| 1,005,075 | Rosenstock | Oct. 3, 1911 |
| 1,985,314 | Coleman | Dec. 25, 1934 |
| 1,996,325 | Cox | Apr. 2, 1935 |